United States Patent
Hirata et al.

US011826963B2

(10) Patent No.: US 11,826,963 B2
(45) Date of Patent: Nov. 28, 2023

(54) ACTIVE ENERGY RAY-CURABLE RESIN COMPOSITION AND INK FOR THREE-DIMENSIONAL MOLDING SUPPORT MATERIALS

(71) Applicant: KJ CHEMICALS CORPORATION, Tokyo (JP)

(72) Inventors: Meiri Hirata, Tokyo (JP); Kouhei Satou, Kumamoto (JP); Toshitsugu Kiyosada, Kumamoto (JP)

(73) Assignee: KJ CHEMICALS CORPORATION, Tokyo (JP)

(*) Notice: Subject to any disclaimer, the term of this patent is extended or adjusted under 35 U.S.C. 154(b) by 739 days.

(21) Appl. No.: 16/971,594

(22) PCT Filed: Jul. 18, 2019

(86) PCT No.: PCT/JP2019/028366
§ 371 (c)(1),
(2) Date: Aug. 20, 2020

(87) PCT Pub. No.: WO2020/017615
PCT Pub. Date: Jan. 23, 2020

(65) Prior Publication Data
US 2020/0384696 A1  Dec. 10, 2020

(30) Foreign Application Priority Data
Jul. 18, 2018  (JP) .................... 2018-134659

(51) Int. Cl.
| | | |
|---|---|---|
| *B29C 64/40* | (2017.01) |
| *B29C 64/112* | (2017.01) |
| *B29C 64/264* | (2017.01) |
| *C08F 2/46* | (2006.01) |
| *C08F 20/54* | (2006.01) |
| *C08F 2/44* | (2006.01) |
| *C08F 2/48* | (2006.01) |
| *C08F 220/58* | (2006.01) |
| *C08K 5/20* | (2006.01) |
| *C08K 5/34* | (2006.01) |
| *C09D 11/30* | (2014.01) |
| *B33Y 30/00* | (2015.01) |
| *B33Y 70/00* | (2020.01) |
| *B33Y 80/00* | (2015.01) |

(52) U.S. Cl.
CPC ............ *B29C 64/40* (2017.08); *B29C 64/112* (2017.08); *B29C 64/264* (2017.08); *C08F 2/44* (2013.01); *C08F 2/46* (2013.01); *C08F 2/48* (2013.01); *C08F 20/54* (2013.01); *C08F 220/58* (2013.01); *C08K 5/20* (2013.01); *C08K 5/34* (2013.01); *C09D 11/30* (2013.01); *B33Y 30/00* (2014.12); *B33Y 70/00* (2014.12); *B33Y 80/00* (2014.12)

(58) Field of Classification Search
CPC ..... B29C 64/40; B29C 64/112; B29C 64/264; C08F 2/46; C08F 20/54
USPC .......................................................... 524/1
See application file for complete search history.

(56) References Cited

U.S. PATENT DOCUMENTS

| | | |
|---|---|---|
| 2013/0234370 A1 | 9/2013 | Suzuki et al. |
| 2016/0263826 A1 | 9/2016 | Suzuki et al. |
| 2016/0264796 A1 | 9/2016 | Suzuki et al. |
| 2017/0240751 A1 | 8/2017 | Morikawa et al. |
| 2018/0215937 A1 | 8/2018 | Kim et al. |
| 2018/0291219 A1 | 10/2018 | Kiyosada |
| 2019/0009453 A1 | 1/2019 | Kitou et al. |
| 2019/0144692 A1 | 5/2019 | Naito et al. |
| 2019/0233634 A1 | 8/2019 | Ota et al. |
| 2020/0131386 A1 | 4/2020 | Kim et al. |

FOREIGN PATENT DOCUMENTS

| | | |
|---|---|---|
| EP | 3 327 095 A1 | 5/2018 |
| JP | 2017-78123 | 4/2017 |
| JP | 2017-222049 | 12/2017 |
| JP | 2017-222154 | * 12/2017 |
| JP | 2018-58974 | 4/2018 |
| WO | 2012/060204 | 5/2012 |
| WO | 2016/121587 | 8/2016 |
| WO | 2017/018453 | 2/2017 |
| WO | 2017/146423 | 8/2017 |
| WO | 2018/101343 | 6/2018 |

OTHER PUBLICATIONS

Official Communication issued in International Patent Application No. PCT/JP2019/028366, dated Oct. 8, 2019, along with English translation thereof.

* cited by examiner

*Primary Examiner* — Deve V Hall
(74) *Attorney, Agent, or Firm* — GREENBLUM & BERNSTEIN, P.L.C.

(57) ABSTRACT

An active energy ray-curable resin composition for three-dimensional molding support materials is provided and includes 0.1 to 90% by mass of a non-polymerizable compound (A) in which inorganic groups/organic groups (I/O value) equals 0.4 to 1.8, and 10 to 99.9% by mass of a polymerizable compound (B) in which inorganic groups/organic groups (I/O value) equals 0.8 to 3.0. By using the active energy ray-curable resin composition, an ink for a support material having well-balanced inorganicity and organicity is obtained, and by using the ink, the support material is easily removed from a roughly molded product without corrosion of ink tanks, ink ejection heads, and similar objects, and a large-sized and highly accurate three-dimensional molded product is obtained.

18 Claims, No Drawings

ACTIVE ENERGY RAY-CURABLE RESIN COMPOSITION AND INK FOR THREE-DIMENSIONAL MOLDING SUPPORT MATERIALS

TECHNICAL FIELD

The present invention relates to an active energy ray-curable resin composition used for forming a support material for supporting a shape during three-dimensional molding, a photocurable ink for a support material comprising the composition, an ink set comprising an ink for a model material and the ink for a support material, and a three-dimensional molded product that is molded by using the ink set.

BACKGROUND ART

Three-dimensional molding is generally performed by using a molding apparatus called 3D printer. As types of 3D printers, a UV inkjet (3D UVIJ) type using an acrylic photocurable resin, a fused deposition modeling (FDM) type using a thermoplastic resin, and further, a powder molding type and a stereolithography apparatus (SLA) type are specifically known. Three-dimensional molding requires a support for supporting a shape to prevent the deformation of a molded product due to its own weight. Particularly, the UVIJ type requires forming a molded product consisting of a model material and a support consisting of a support material simultaneously, and a step of removing the support material from a roughly molded product after molding must be provided.

To remove a support material from a roughly molded product, for example, a method of manually releasing the support material with a spatula, a brush, or similar objects, a method of blowing off the support material with a water jet, a method of removing the support material comprising a thermoplastic resin or a hot-melt wax by heating and melting the support material, and a method of removing the support material by dissolving, dispersing, or swelling and collapsing the support material by using an aqueous alkaline solution, water, or an organic solvent have been proposed. Among the above, the method of dissolving and dispersing the support material in water attracts attention since the method allows easy removal of the support material simply by immersing the roughly molded product comprising a model material and the support material in water, enabling efficient removal of the support material clogging the details of the molded product without preparing a special washing liquid, and barely causing damage and deformation of the roughly molded product. For example, Patent Literature 1 has proposed a photocurable resin composition for a support material composed mainly of a water-soluble monofunctional ethylenically unsaturated monomer, and polyoxypropylene glycol (PPG), and/or water. Patent Literature 2 has proposed a photocurable resin composition for a support material composed mainly of a water-soluble monofunctional ethylenically unsaturated monomer, PPG, polyoxyethylene glycol (PEG), and a water-soluble organic solvent. Patent Literature 3 has proposed a photocurable resin composition for a support material composed mainly of a monofunctional ethylenically unsaturated monomer having a polyoxyethylene group, a polyoxypropylene group, or a polyoxybutylene group, and a (meth)acrylic monomer. Patent Literature 4 has proposed a photocurable resin composition for a support material composed mainly of polyoxybutylene glycol (PTMG) and a water-soluble monofunctional ethylenically unsaturated monomer.

However, the compositions described in Patent Literatures 1 to 4 essentially comprise PPG, PTMG, and/or similar substances as main components. When the polyoxyalkyl glycols as such have a low molecular weight, an ink for a support material obtained therefrom has a strong polarity, causing high moisture absorption, and an ink tank filled with an ink, and a head, a nozzle, or a similar object ejecting an ink are easily corroded. Particularly when a shear mode type inkjet head utilizing the shear mode deformation of a piezoelectric member is used, an ink having a strong polarity easily causes electrode corrosion disadvantageously due to the structure of the head in which the ink is in contact with the electrode. In contrast, when the molecular weight is high, an ink for a support material obtained therefrom has a high viscosity and is difficult to use in 3D UVIJ. Even when the ink is diluted with water or an organic solvent, high moisture absorption and high polarity still remain problematic since the ink dissolves exclusively in a solvent with a strong polarity.

There is the problem that the entirety of a support material using a polyoxyalkyl glycol having a middle or high molecular weight is released from a model material when immersed in water, and polyoxyalkyl glycol in an oily residue form is dispersed in water and adheres to any parts of the model material including surfaces and details in contact with water. The oily residue as such must be removed by finishing such as rewashing with an alcohol or wiping, which requires a lot of work and costs. Since the aqueous solution after the washing is turbid and sometimes contaminated with an oil film, there is also the problem that wastewater treatment is difficult.

Patent Literature 5 has proposed a photocurable resin composition for a support material composed mainly of a water-soluble monofunctional ethylenically unsaturated monomer and a $C_3$ to $C_6$ diol, Patent Literature 6 has proposed a photocurable resin composition for a support material comprising an amine-containing monomer and an amine-containing polymer, and Patent Literature 7 has proposed an active energy ray-curable resin composition for a support material comprising an ionic monomer. The above inks for a support material reduce the time required for support material removal, but problems such as the 3D printer head corrosion still remain unresolved due to their strong polarity.

Further, in cases where an ink for a support material having a strong polarity is used, the molding of a large-sized product requires more time, and there is the risk of deformation of the support material due to moisture absorption during the molding, resulting in lowered molding accuracy. Moreover, the above patent literatures refer to nothing as to the molding of sharp corners and side surfaces that is the most difficult and unavoidable in performing highly accurate three-dimensional molding.

With respect to molding with an inkjet type 3D printer, there is a demand for larger-scale and higher-speed molding with high accuracy and high performance. Also, there is a demand for the development of a support material having sufficient strength and moisture resistance, being usable in 3D printers with various structures and simultaneously causing no surface contamination of molded products, requiring no finishing step, and allowing easy treatment of water and similar liquids used in washing.

CITATION LIST

Patent Literature

Patent Literature 1: WO 2012/060204 A1
Patent Literature 2: WO 2017/018453 A1
Patent Literature 3: JP 2018-058974 A
Patent Literature 4: WO 2018/101343 A1
Patent Literature 5: JP 2017-222049 A
Patent Literature 6: WO 2017/146423 A1
Patent Literature 7: WO 2016/121587 A1

SUMMARY OF THE INVENTION

Problems to be Solved by the Invention

The object of the present invention is to provide an active energy ray-curable resin composition for a support material which can efficiently remove a support material from a roughly molded product composed integrally of a model material and the support material simply by immersing it in a washing liquid such as water and simultaneously makes it possible to obtain a highly accurate and large-sized three-dimensional molded product without a finishing step, and to provide a photocurable ink for a support material comprising the resin composition that is applied to 3D printers having various structures. Another object of the present invention is to provide a photocurable ink for a model material, a photocurable ink set comprising the photocurable ink for a model material and ink for a support material, and a three-dimensional molded product that is molded by using the photocurable ink set.

Solution to the Problems

The present inventors have intensively dedicated themselves to studies to solve the above problems, found that the above problems can be solved by using an active energy ray-curable resin composition for three-dimensional molding support materials, comprising 0.1 to 90% by mass of a non-polymerizable compound (A) in which inorganic groups/organic groups (I/O value) equals 0.4 to 1.8 and 10 to 99.9% by mass of a polymerizable compound (B) in which inorganic groups/organic groups (I/O value) equals 0.8 to 3.0, by which the above objects can be achieved, and arrived at the present invention.

Namely, the present invention provides:
(1) an active energy ray-curable resin composition for three-dimensional molding support materials, comprising 0.1 to 90% by mass of a non-polymerizable compound (A) in which inorganic groups/organic groups (I/O value) equals 0.4 to 1.8 and 10 to 99.9% by mass of a polymerizable compound (B) in which inorganic groups/organic groups (I/O value) equals 0.8 to 3.0;
(2) the active energy ray-curable resin composition according to (1), wherein (A) is an amide compound (a1) having one or more amide groups in a molecule;
(3) the active energy ray-curable resin composition according to (1) or (2), wherein (A) is at least one compound selected from (a1-1) N-substituted amides and N,N-disubstituted amides represented by a general formula (1), (a1-2) N-substituted lactams represented by a general formula (2), (a1-3) β-alkoxy-N-substituted propionamides and β-alkoxy-N,N-disubstituted propionamides represented by a general formula (3), and (a1-4) β-amino-N-substituted propionamides and β-amino-N,N-disubstituted propionamides represented by a general formula (4):

[Chemical formula 1]

General formula (1)

$$R_1-\overset{O}{\overset{\|}{C}}-N\overset{R_2}{\underset{R_3}{\diagdown}}$$

[Chemical formula 2]

General formula (2)

$$R_4-N\underbrace{\phantom{XXX}}_{O}]_n$$

[Chemical formula 3]

General formula (3)

$$R_6-O-CH_2-\overset{R_5}{\underset{}{\overset{|}{C}H}}-\overset{O}{\overset{\|}{C}}-N\overset{R_7}{\underset{R_8}{\diagdown}}$$

[Chemical formula 4]

General formula (4)

$$\overset{R_{10}}{\underset{R_{11}}{\diagdown}}N-CH_2-\overset{R_9}{\underset{}{\overset{|}{C}H}}-\overset{O}{\overset{\|}{C}}-N\overset{R_{12}}{\underset{R_{13}}{\diagdown}}$$

(wherein $R_1$ to $R_4$ each independently represent a hydrogen atom or a $C_1$ to $C_{18}$ linear, branched, or cyclic aliphatic hydrocarbon, a hydroxy group-containing aliphatic hydrocarbon, or an aromatic hydrocarbon (excluding the case where $R_1$, $R_2$, and $R_3$ are simultaneously hydrogen atoms and the case where $R_4$ is a hydrogen atom), $R_5$ and $R_9$ represent a hydrogen atom or a methyl group, $R_6$ to $R_8$, $R_{10}$ to $R_{13}$ each independently represent a hydrogen atom or a $C_1$ to $C_{18}$ linear, branched, or cyclic aliphatic hydrocarbon, a hydroxy group-containing aliphatic hydrocarbon, or an aromatic hydrocarbon (excluding the case where $R_7$ and $R_8$ are simultaneously hydrogen atoms, the case where $R_{10}$ and $R_{11}$ are hydrogen atoms, and the case where $R_{12}$ and $R_{13}$ are simultaneously hydrogen atoms, and including the case where $R_2$ and $R_3$, $R_7$ and $R_8$, $R_{10}$ and $R_{11}$, or $R_{12}$ and $R_{13}$ form a saturated 5- to 7-membered ring (including an oxygen atom-containing ring) together with a nitrogen atom carrying them), and n in the general formula (2) represents an integer of 1 to 3);
(4) the active energy ray-curable resin composition according to any one of (1) to (3), wherein (A) is at least one compound selected from (a1-5) β-alkoxy-N-substituted propionamides and β-alkoxy-N,N-disubstituted propionamides represented by a general formula (5):

[Chemical formula 5]

General formula (5)

$$R_{15}-O-CH_2-\overset{R_{14}}{\underset{}{\overset{|}{C}H}}-\overset{O}{\overset{\|}{C}}-N\overset{R_{16}}{\underset{R_{17}}{\diagdown}}$$

(wherein $R_{14}$ represents a hydrogen atom or a methyl group, $R_{15}$ represents a $C_1$ to $C_{18}$ linear or branched alkyl group, $R_{16}$ and $R_{17}$ each independently represent a hydrogen atom or a $C_1$ to $C_6$ linear or branched alkyl group (excluding the case where $R_{16}$ and $R_{17}$ are simultaneously hydrogen atoms, and including the case where $R_{16}$ and $R_{17}$ form a saturated 5- to 7-membered ring (including an oxygen atom-containing ring) together with a nitrogen atom carrying them);

(5) the active energy ray-curable resin composition according to (1), wherein (A) is a low molecular weight compound (a2) having a melting point or a softening point of 0° C. or higher and a molecular weight of less than 2,000;

(6) the active energy ray-curable resin composition according to (1), wherein (A) is an oligomer and/or a polymer (a3) having a glass transition temperature (Tg) of 20° C. or higher and a molecular weight of 2,000 or higher;

(7) the active energy ray-curable resin composition according to (1) or (5), wherein (A) is one or more alcohols (a4) selected from sorbitan fatty acid esters, polyalkyleneglycol fatty acid esters, glycerin fatty acid esters, sorbitan aliphatic ethers, polyalkyleneglycol aliphatic ethers, and glycerin aliphatic ethers;

(8) the active energy ray-curable resin composition according to any one of (1) to (7), wherein (B) is a monomer having one or more polymerizable functional groups selected from (meth)acrylate groups, (meth)acrylamide groups, vinyl groups, allyl groups, and maleimide groups;

(9) the active energy ray-curable resin composition according to any one of (1) to (8), wherein (B) is one or more monomers selected from (meth)acryloylmorpholine, N,N-dimethyl(meth)acrylamide, N,N-diethyl(meth)acrylamide, N,N-dimethylaminopropyl(meth)acrylamide, N-isopropyl(meth)acrylamide, N-hydroxyethyl(meth)acrylamide, N-methyl-N-hydroxyethyl(meth)acrylamide, N-hydroxypropyl(meth)acrylamide, N,N-bishydroxyethyl(meth)acrylamide, N-butoxymethyl(meth)acrylamide, and diacetone(meth)acrylamide;

(10) a photocurable ink for a support material comprising the active energy ray-curable resin composition according to any one of (1) to (9), or the active energy ray-curable resin composition according to any one of (1) to (9) and a photopolymerization initiator (C);

(11) the photocurable ink for a support material according to (10) having an I/O value of 0.8 to 2.0;

(12) the photocurable ink for a support material according to (10) or (11) that is used for inkjet type three-dimensional molding, comprising 1 to 80% by mass of (A), 20 to 99% by mass of (B), and 0 to 5% by mass of (C);

(13) a three-dimensional molding photocurable ink for a model material, wherein inorganic groups/organic groups (I/O value) equals 0.4 to 0.8;

(14) a three-dimensional molding ink set using a photocurable ink for a model material in which inorganic groups/organic groups (I/O value) equals 0.4 to 0.8 and a photocurable ink for a support material in which inorganic groups/organic groups (I/O value) equals 0.8 to 2.0; and

(15) a three-dimensional molded product that is molded by using the three-dimensional molding ink set according to (14).

Effects of the Invention

According to the present invention, an active energy ray-curable resin composition comprising a non-polymerizable compound (A) and a polymerizable compound (B) having specific I/O values is cured by active energy ray irradiation simultaneously with or immediately after three-dimensional molding to form a support material, and thereby a roughly molded product that is integrally formed from the support material and a model material supported with the support material is obtained. By immersing the obtained roughly molded product in a washing liquid such as water, the support material is dissolved or dispersed in the washing liquid such as water and can be easily and quickly released and removed from the model material. In addition, the difference in I/O values between the ink for a support material and the ink for a model material (I/O value of the ink for a support material—I/O value of the ink for a model material=0.4 to 1.6) is included in a specific range, the organic and inorganic properties of the ink for a support material and the ink for a model material are well balanced, and a highly accurate molded product forming sharp side surfaces and corners is obtained. The ink for a support material according to the present invention has an I/O value in the specific range and does not cause corrosion of the heads, nozzles and electrodes of 3D printers, a support material obtained therefrom has well-balanced moisture resistance and solubility and dispersibility in a washing liquid such as water, the support material itself also exhibits good washing properties, no contamination occurs on a surface of a molded product after washing, and a finishing step may also be omitted.

Hereinafter, the present invention is described in detail.

The active energy ray-curable resin composition according to the present invention comprises a non-polymerizable compound (A) and a polymerizable compound (B), and (A) and (B) have I/O values of 0.4 to 1.8 and 0.8 to 3.0, respectively. The I/O value is an abbreviation of Inorganic/Organic Balance (ratio of inorganicity/organicity) and is also called IOB value. The I/O value represents a ratio of an inorganic value to an organic value and is an index of the polarity strength of an organic compound. The I/O value is defined in an "organic conceptional diagram" and is obtainable by referring to "Atsushi Fujita, Yuki-Kagobutsu-no-yosoku-to-yuki-gainenzu (Prediction of Organic Compounds and Organic Conceptional Diagram), Kagaku-no-Ryouiki, Vol. 11, 10, pp. 719 to 725 (1957) or A. Fujita, Prediction of Organic Compounds by Conceptional Diagram, Pharmaceutical Bulletin, Vol. 2, No. 2. 1954, pp. 163 to 173".

When the I/O value of (A) is less than 0.4, the polarity of the non-polymerizable compound is low, causing difficulty in preparing a homogeneous ink for a support material and the obtained support material exhibits poor washing properties. In contrast, when the I/O value of (A) exceeds 1.8, the polarity of the obtained ink for a support material is very high even though (A) is combined with a polymerizable compound (B), and the obtained support material has high moisture absorption and is not applicable to long-time molding or molding of a large-sized product. From the above viewpoints, the I/O value of (A) is preferably 0.5 to 1.6 and particularly preferably 0.6 to 1.5.

When the I/O value of (B) is less than 0.8, it takes a long time to wash out the support material obtained by curing, and washing properties are not satisfactory. In contrast, when the I/O value of (B) exceeds 3.0, the cured support material locally has high moisture absorption and is not applicable to the molding of a large-sized product that takes a long time. From the above viewpoints, the I/O value of (B) is preferably 0.9 to 2.8, and particularly preferably 1.0 to 2.5.

The active energy ray-curable resin composition according to the present invention comprises 0.1 to 90% by mass of a non-polymerizable compound (A) and 10 to 99.9% by mass of a polymerizable compound (B). When the contents of (A) and (B) are within the above ranges, an ink for a support material having an I/O value of 0.8 to 2.0 can be prepared by using (A) and (B) having different I/O values and a highly accurate molded product having sharp corners is obtained. From the above viewpoints, the resin composition comprises preferably 5 to 80% by mass of (A) and 20 to 95% by mass of (B), and particularly preferably 20 to 70% by mass of (A) and 30 to 80% by mass of (B).

A non-polymerizable compound (A) used in the present invention is preferably an amide compound (a1) having one or more amide groups in a molecule. Since (a1) has an appropriate I/O value, objective inks for a support material, support materials, and molded products are obtained by using (a1). Moreover, since (a1) can form a hydrogen bond with a protonic washing agent such as water due to its amide group(s), the obtained support material has sufficient solubility and dispersibility in a washing liquid. With regard to washing properties, (a1) is particularly preferably water soluble or water dispersible. In the present invention, "being water soluble" means that the solubility in water (at a temperature of 25° C.) is 1 (g/100 g of water) or higher, and "being water dispersible" means being emulsified and dispersed in water and stabilizable in a microparticle state.

Specifically, (a1) is at least one compound selected from (a1-1) encompassing N-substituted amides, N,N-disubstituted amides, fatty acid amides, N-substituted fatty acid amides, and N,N-disubstituted fatty acid amides, (a1-2) encompassing N-substituted pyrrolidones, N-substituted piperidones, and N-substituted-ε-caprolactams, (a1-3) encompassing β-alkoxy-N-substituted propionamides, and (β-alkoxy-N,N-disubstituted propionamides, and (a1-4) encompassing β-amino-N-substituted propionamides and β-amino-N,N-disubstituted propionamides. The above amide compounds may be used alone or in combination of 2 or more thereof.

In addition, use of (a1-5) β-alkoxy-N,N-dialkyl propionamides into which a $C_1$ to $C_{18}$ alkoxy group and a $C_1$ to $C_6$ alkyl group have been introduced is more preferable since the compounds have excellent solubility in the polymerizable compound (B) and other components, the support material after curing has improved solubility and dispersibility in a washing liquid, and the support material, due to its excellent removability, is completely and quickly released from a model material.

Examples of (a1-1) amide compounds include N-substituted formamides, N,N-disubstituted formamides, N-substituted acetamides, N,N-disubstituted acetamides, fatty acid amides, N-substituted fatty acid amides, N,N-disubstituted fatty acid amides, aromatic carboxylic acid amides, N-substituted aromatic carboxylic acid amides, and N,N-disubstituted aromatic carboxylic acid amides into which a $C_1$ to $C_{18}$ linear, branched, or cyclic aliphatic hydrocarbon, a hydroxy group-containing aliphatic hydrocarbon, or an aromatic hydrocarbon has been introduced. The above amide compounds may be used alone or in combination of 2 or more thereof.

Examples of (a1-2) amide compounds include N-substituted pyrrolidones, N-substituted piperidones, and N-substituted-ε-caprolactams into which a $C_1$ to $C_{18}$ linear, branched, or cyclic aliphatic hydrocarbon, a hydroxy group-containing aliphatic hydrocarbon, or an aromatic hydrocarbon has been introduced. The above amide compounds may be used alone or in combination of 2 or more thereof.

Examples of (a1-3) amide compounds include β-alkoxy-N-substituted propionamides, β-alkoxy-N-substituted-2-methylpropionamides, β-alkoxy-N,N-disubstituted propionamides, and β-alkoxy-N,N-disubstituted-2-methylpropionamides into which a $C_1$ to $C_{18}$ linear, branched, or cyclic alkoxy group or a hydroxyalkoxy group, and a $C_1$ to $C_{18}$ linear, branched or cyclic aliphatic hydrocarbon, a hydroxy group-containing aliphatic hydrocarbon, or an aromatic hydrocarbon have been introduced, specifically β-methoxy-N,N-dimethylpropionamide, β-methoxy-N,N-dimethyl-2-methylpropionamide, β-methoxy-N,N-ethylhexylpropionamide, β-butoxy-N,N-dimethylpropionamide, β-(2-ethylhexoxy)-N,N-dimethylpropionamide, β-dodecyloxy-N,N-dimethylpropionamide, β-octadecyloxy-N,N-dimethylpropionamide, and cyclohexyloxy-N,N-dimethylpropionamide. The above amide compounds may be used alone or in combination of 2 or more thereof.

Examples of (a1-4) amide compounds include β-amino-N-substituted propionamides, β-amino-N-substituted-2-methylpropionamides, β-amino-N,N-disubstituted propionamides, and β-amino-N,N-disubstituted-2-methylpropionamides into which a $C_1$ to $C_{18}$ linear, branched, or cyclic alkoxy group or a hydroxyalkoxy group, and a $C_1$ to $C_{18}$ linear, branched or cyclic aliphatic hydrocarbon, a hydroxy group-containing aliphatic hydrocarbon, an aromatic hydrocarbon, or a similar compound have been introduced. The above amide compounds may be used alone or in combination of 2 or more thereof.

The content of (a1) is preferably 0.5 to 80% by mass relative to the entirety of the active energy ray-curable resin composition. When the content of (a1) is 0.5% by mass or higher, the viscosities of the active energy ray-curable resin composition and an ink for a support material containing the same are reduced and excellent inkjet suitability is obtained. When the content of (a1) is 80% by mass or lower, a support material obtained by curing has well-balanced washing properties, moisture resistance, and hardness, enabling highly accurate molding. Further, the content of (a1) from 2 to 60% by mass is more preferable.

The non-polymerizable compound (A) used in the present invention preferably has a melting point or a softening point of 0° C. or higher. In other words, the non-polymerizable compound (A) is preferably in a solid or wax state at 0° C. When the compound is in a solid or wax state at 0° C., support materials obtained by curing have both good hardness and moisture resistance, and highly accurate molding is performed. Further, the compound is particularly preferably a low molecular weight compound (a2) having a molecular weight of 2,000 or lower. The molecular weight of 2,000 or lower is preferable since the viscosities of the active energy ray-curable resin composition and an ink for a support material containing the same are reduced, excellent inkjet suitability is obtained, and a support material obtained by curing has a sufficient dissolution rate and a sufficient dispersion rate in a washing liquid such as water. Examples of the low molecular weight compounds (a2) include 1,2-heptandiol, 1,7-heptandiol, 1,2-octandiol, 1,8-octandiol, 1,9-nonanediol, 2-butyl-2-ethyl-1,3-propanediol, a glycerin monoalkyl ether and a glycerin monoalkenyl ether into which a $C_8$ to $C_{22}$ alkyl or alkenyl group has been introduced, a glycerin monoaliphatic ester into which a $C_8$ to $C_{22}$ saturated fatty acid or unsaturated fatty acid has been introduced, a polyoxyethylene monoalkyl ether (molecular weight: 250 to 2,000) into which a $C_8$ to $C_{22}$ alkyl group has been introduced, a polyoxyethylene monoalkyl ether (molecular weight: 250 to 2,000) into which a $C_{10}$ to $C_{22}$ alkenyl group has been introduced, a sorbitan monoaliphatic ester, a sorbitan trialiphatic ester, and a polyethylene glycol fatty acid ester into which a $C_{10}$ to $C_{22}$ saturated fatty acid or unsaturated fatty acid has been introduced, and a polyethylene glycol sorbitan monoaliphatic ester (molecular weight: 350 to 2,000) into which a $C_{10}$ to $C_{22}$ saturated fatty acid and polyethylene glycol have been introduced. With regard to their excellent amphiphilic properties, further increased compatibility with (B) and other components, and obtained products with higher accuracy, (a2) more preferably has an I/O value of 0.8 to 1.8. The above low molecular weight compounds (a2) may be used alone or in combination of 2 or more thereof.

The content of (a2) is preferably 70% by mass or lower relative to the entirety of the active energy ray-curable resin composition. When the content of (a2) is 0.1% by mass or higher, obtained support materials have a sufficient dissolution rate and a sufficient dispersion rate in a washing liquid such as water. When the content of (a2) is 70% by mass or lower, the viscosities of the active energy ray-curable resin composition and an ink for a support material comprising the same are maintained at a lower level, excellent inkjet suitability is obtained, sufficient hardness (initial hardness) is obtained during the time span from the ejection or injection of an ink for a support material to its complete curing, and highly accurate molding is performed. Further, the content of (a2) is particularly preferably 0.5 to 50% by mass.

The non-polymerizable compound (A) used in the present invention is preferably an oligomer and/or a polymer (a3) having a glass transition temperature (Tg) of 20° C. or higher. When Tg is 20° C. or higher, a sufficient initial hardness is achieved, a support function is provided, and highly accurate molding is performed. The number average molecular weight of (a3) is more preferably 2,000 or higher. The molecular weight of 2,000 or higher is preferable since obtained support materials have good moisture resistance, deformation due to local moisture absorption does not occur even if a large-sized product is molded over a long time, and a highly accurate molded product is obtained.

In addition, the number average molecular weight of 100,000 or lower is also preferable since the viscosities of the active energy ray-curable resin composition and an ink for a support material comprising the same are reduced, and excellent inkjet suitability is obtained. Further, the number average molecular weight of 2,000 to 50,000 is particularly preferable since a support material after curing also has a sufficient dissolution rate and a sufficient dispersion rate in a washing liquid such as water. With regard to further increasing compatibility with (B) and other components and obtaining a molded product with higher accuracy, the I/O value of (a3) is more preferably 0.8 to 1.8.

Examples of (a3) include homo-oligomers or homopolymers, co-oligomers or copolymers of the polymerizable compound (B), and co-oligomers or copolymers obtained by the copolymerization of (B) and other monomers. Particularly, homopolymers or copolymers of N,N-dimethylaminoethyl(meth)acrylate, hydroxyethyl(meth)acrylate, polyethyleneglycol(meth)acrylate, alkoxypolyethyleneglycol(meth) acrylate, glycerin mono(meth)acrylate, tetrahydrofurfuryl (meth)acrylate, N-isopropyl(meth)acrylamide, N-ethoxymethyl(meth)acrylamide, N-butoxymethyl(meth)acrylamide, N-allyl(meth)acrylamide, N,N-dimethyl(meth)acrylamide, N,N-diethyl(meth)acrylamide, N,N-dimethylaminopropyl(meth)acrylamide, (meth)acryloylmorpholine, N-hydroxyethyl(meth)acrylamide, N-methyl-N-hydroxyethyl(meth)acrylamide, N-hydroxypropyl(meth)acrylamide, N,N-bishydroxyethyl(meth)acrylamide, diacetone(meth) acrylamide, N-vinylpyrrolidone, N-vinylcaprolactam, N-vinylacetamide, acrylonitrile, ethylene glycol monovinyl ether, diethylene glycol monovinyl ether, vinyl trifluoroacetate, vinyloxytetrahydropyrane, and hydroxyethylvinylether are preferable since the industrial products of the above monomers are easily available. Examples of other oligomers and/or polymers having an I/O value of 0.4 to 1.8 and a Tg of 20° C. or higher include polyvinyl alcohol and polyurethane. The I/O value of a co-oligomer or a copolymer is obtained as follows:

I/O value of copolymer of Monomer 1 and Monomer 2=I/O value of Monomer 1×mass fraction of Monomer 1+I/O value of Monomer 2×mass fraction of Monomer 2.

The above oligomers and/or polymers may be used alone or in combination of 2 or more thereof.

With regard to good compatibility with (B) and other components, (a3) is more preferably an oligomer and/or a polymer comprising 50 to 100% by mass of (meth)acryloylmorpholine, N,N-dimethyl(meth)acrylamide, N,N-diethyl(meth)acrylamide, N,N-dimethylaminopropyl(meth) acrylamide, N-hydroxyethyl(meth)acrylamide, N-methyl-N-hydroxyethyl(meth)acrylamide, N-hydroxypropyl(meth) acrylamide, N,N-bishydroxyethyl(meth)acrylamide, N-butoxymethyl(meth)acrylamide, or diacetone(meth)acrylamide.

The content of (a3) is preferably 30% by mass or lower relative to the entirety of the active energy ray-curable resin composition. The content of (a3) of 0.1% by mass or higher is preferable since the viscosities of the active energy ray-curable resin composition and an ink for a support material comprising the same are easily adjustable, the hardness and moisture resistance of a support material obtained by curing are good, and highly accurate molding is performed. When the content of (a3) is lower than 30% by mass, the viscosities of the active energy ray-curable resin composition and the ink for a support material are maintained at a lower level and good inkjet suitability is obtained. Further, the content of (a3) is particularly preferably 0.5 to 25% by mass.

The non-polymerizable compounds (A) used in the present invention are preferably one or more alcohols (a4) selected from sorbitan fatty acid esters, polyalkyleneglycol fatty acid esters, glycerin fatty acid esters, sorbitan aliphatic ethers, polyalkyleneglycol aliphatic ethers, and glycerin aliphatic ethers. In the present invention, "aliphatic" of the fatty acid esters (aliphatic acid esters) and aliphatic ethers means a linear, branched or alicyclic substituent formed by carbon atoms with saturated or unsaturated bonds, and the number of carbon atoms is 8 or greater. These compounds partly overlap with the compounds of (a2), but compounds of (a4) are not particularly limited by their melting points or softening points, and may be used at 0° C. or at room temperature (25° C.) in a solid or liquid state. The above compounds have an I/O value of 0.8 to 1.6, and the support materials obtained therefrom are excellent in all of initial hardness, washing properties, and moisture resistance and may be suitably used in highly accurate molding. The above low molecular weight compounds (a4) may be used alone or in combination of 2 or more thereof.

The content of (a4) is preferably 70% by mass or lower relative to the entirety of the active energy ray-curable resin composition. When the content of (a4) is 0.1% by mass or higher, obtained support materials have a sufficient dissolution rate and a sufficient dispersion rate in a washing liquid such as water. When the content of (a4) is 70% by mass or lower, the viscosities of the active energy ray-curable resin composition and an ink for a support material comprising the same are maintained at a lower level, excellent inkjet suitability is obtained, support materials have sufficient initial hardness, and highly accurate molding is performed. Further, the content of (a4) is particularly preferably 0.5 to 50% by mass.

As the non-polymerizable compounds (A), any one or more compounds selected from the group consisting of (a1) to (a4) may be used. Namely, (a1), (a2), (a3), and (a4) may be used alone or in any combinations thereof. Particularly, a combination of compounds having different I/O values is preferable since a mixture (A) having an optimal I/O value is easily prepared with it. The I/O value of a mixture can be obtained as follows:

$$\text{I/O value of Mixture} = \text{I/O value of Component 1} \times \text{mass fraction of Component 1} + \text{I/O value of Component 2} \times \text{mass fraction of Component 2}.$$

The polymerizable compounds (B) used in the present invention have an I/O value of 0.8 to 3.0 and are preferably one or more monomers selected from (meth)acrylates, (meth)acrylamides, N-substituted (meth)acrylamides, vinyl group-containing monomers, allyl group-containing monomers, and maleimide group-containing monomers. The above monomers may be used alone or in combination of 2 or more thereof.

As (meth)acrylates, at least one monomer selected from N,N-dialkyloxyalkyl(meth)acrylate, hydroxyalkyl(meth) acrylate, polyalkyleneglycol(meth)acrylate, alkoxypolyalkylene glycol(meth)acrylate, glycerin mono(meth)acrylate, and similar monomers is preferable. The above (meth) acrylates may be used alone or in combination of 2 or more thereof.

N-substituted (meth)acrylamides include N-substituted (meth)acrylamides and N,N-disubstituted (meth)acrylamides and specific examples thereof include N-alkyl(meth) acrylamide, N,N-dialkyl(meth)acrylamide, N-hydroxyalkyl (meth)acrylamide, N-alkoxyalkyl(meth)acrylamide, N-hydroxyalkyl-N-alkyl(meth)acrylamide, (meth)acryloylmorpholine, and diacetone(meth)acrylamide having a $C_1$ to $C_5$ linear or branched alkyl group or alkenyl group, a $C_1$ to $C_6$ linear, branched, or cyclic hydroxyalkyl group, aminoalkyl group, dialkylaminoalkyl group, alkoxyalkyl group, or dialkylaminoalkyl group. The above water-soluble N-substituted (meth)acrylamides may be used alone or in combination of 2 or more thereof.

As vinyl group-containing monomers, one or more monomers selected from N-vinylpyrrolidone, N-vinylcaprolactam, N-vinylacetamide, acrylonitrile, vinyloxazolin, ethylene glycol monovinyl ether, diethylene glycol monovinyl ether, ethyl vinyl ether, and hydroxyethyl vinyl ether are preferable. The above vinyl group-containing monomers may be used alone or in combination of 2 or more thereof.

As allyl group-containing monomers, one or more monomers selected from N-allylpyrrolidone, N-allylcaprolactam, N-allylacetamide, allylnitrile, allyloxazoline, ethylene glycol monoallyl ether, diethylene glycol monoallyl ether, and hydroxyethyl allyl ether are preferable. The above allyl group-containing monomers may be used alone or in combination of 2 or more thereof.

As maleimide group-containing monomers, one or more monomers selected from N-alkylmaleimide compounds such as N-hydroxyalkylmaleimides having a $C_1$ to $C_6$ linear, branched, or cyclic hydroxyalkyl group and N-ethylmaleimides are preferable. The above maleimide group-containing monomers may be used alone or in combination of 2 or more thereof.

The content of the polymerizable compound(s) (B) used in the present invention is preferably 10 to 99.9% by mass relative to the entirety of the active energy ray-curable resin composition. When the content of (B) is 10% by mass or higher, the viscosities of the active energy ray-curable resin composition and an ink for a support material comprising the same are reduced, excellent inkjet suitability is obtained, a high curing rate and great hardness of a cured support material are achieved, and highly accurate molding is performed. When the content of (B) is 99.9% by mass or lower, a support material has well-balanced washing properties and initial hardness and is suitably used in the molding of a large-sized product over a long time. Further, the content of (B) is more preferably 20 to 95% by mass and particularly preferably 30 to 80% by mass.

(B) is more preferably an amide group-containing monomer. (B) having an amide group is preferable since it exhibits good solubility in (A), allowing easy preparation of a homogeneous and highly stable active energy ray-curable resin composition and an ink for a support material containing the same, and cured products obtained therefrom have high hardness and excellent support properties as support materials. Further, (B), which is a monomer having a (meth) acrylamide group, is more preferable due to its excellent radical polymerizability. Particularly preferable are (Meth) acryloylmorpholine, N,N-dimethyl(meth)acrylamide, N,N-diethyl(meth)acrylamide, N,N-dimethylaminopropyl(meth) acrylamide, N-hydroxyethyl(meth)acrylamide, N-methyl-N-hydroxyethyl(meth)acrylamide, N-hydroxypropyl(meth) acrylamide, N,N-bishydroxyethyl(meth)acrylamide, N-butoxymethyl(meth)acrylamide, and diacetone(meth) acrylamide, which have high solubility in water, exhibit high curability by active energy ray irradiation, impart high hardness to obtained cured products and allow highly accurate molding even for long-time molding and the molding of large-sized products.

The active energy ray-curable resin composition according to the present invention (hereinafter abbreviated as "D") is a composition that is cured by polymerization into a solid and the polymerization method is not particularly limited. The composition can be obtained by known methods for polymerizing unsaturated groups. For example, radical polymerization by an active energy ray or heat, anionic polymerization, and cationic polymerization are mentioned, and polymerization with an active energy ray is preferable since polymerization is easily regulated by adding a photopolymerization initiator or adjusting the exposure dose.

The active energy ray used to cure (D) indicates electromagnetic waves or charged particle rays having energy quantum, namely active energy rays such as visible light, electron beam, UV ray, infrared ray, X ray, α ray, β ray, and γ ray. Examples of their sources are a high-pressure mercury lamp, a halogen lamp, a xenon lamp, a metal halide lamp, an LED lamp, an electron beam accelerator, and radiation sources of radioactive elements. When an electron beam is used as an active energy ray, a photopolymerization initiator is usually unnecessary, but when other active energy rays are used, a photopolymerization initiator is preferably added. As an active energy ray to be irradiated, a UV ray is preferable with regard to storage stability and curing rate of (D) and low harmfulness of the UV ray itself.

Examples of the photopolymerization initiator (C) used in the present invention include a photoradical polymerization initiator, a photocationic polymerization initiator, and a photoanionic polymerization initiator. The photoradical polymerization initiator may be appropriately selected from ordinary ones including acetophenone-, benzoin-, benzophenone-, α-aminoketone-, xanthone-, anthraquinone-, and acylphosphine oxide-based photoradical polymerization initiators, and high molecular weight photopolymerization initiators. Examples of acetophenones include diethoxyacetophenone, 2,2-dimethoxy-1,2-diphenylethan-1-one, 2-hydroxy-2-methyl-1-phenylpropan-1-one, 1-(4-isopropylphenyl)-2-hydroxy-2-methylpropan-1-one, 4-(2-hydroxyethoxy)-phenyl-(2-hydroxy-2-propyl)ketone, 1-hydroxycyclohexylphenylketone, and 2-methyl-1-(4-methylthiophenyl)-2-morpholinopropane-1; examples of benzoins include benzoin, α-methylbenzoin, α-phenylbenzoin, α-allylbenzoin, α-benzoylbenzoin, benzoinmethylether, benzoinethylether, benzoinisopropylether, benzoinisobutylether, and benzyldimethylketal; examples of benzophenones include benzophenone, benzoylbenzoic acid, and methyl benzoylbenzoic acid; examples of α-aminoketones include 2-methyl-1-(4-methylthiophenyl)-2-(4-morpholinyl)-1-propanone, 2-benzyl-2-(dimethylamino)-1-(4-(4-morpholinyl)phenyl)-1-butanone, and 2-(dimethylamino)-2-(4-methylphenyl)methyl-1-(4-(4-morpholinyl)phenyl)-1-butanone; examples of xanthones include xanthone, and thioxanthone; examples of anthraquinones include anthraquinone, 2-methylanthraquinone, and 2-ethylanthraquinone; examples of acylphosphine oxides include bis(2,4,6-trimehtylbenzoyl)-phenylphosphine oxide, and 2,4,6-trimehtylbenzoyl-diphenyl-phosphine oxide; and examples of high molecular weight photopolymerization initiators include a polymer of 2-hydroxy-2-methyl-1-(4-(1-methylvinyl)phenyl)propan-1-one. Examples of photocationic polymerization initiators include antimony-based initiators such as diphenyliodonium hexafluoroarsenate, and non-antimony-based initiators such as triphenylsulfonium tetrafluoroborate, and bis(4-t-butylphenyl)iodonium hexafluorophosphate. Examples of photoanionic polymerization initiators include initiators such as acetophenone 0-benzoyloxim, and 2-(9-oxoxanthen-2-yl)propionic acid 1,5,7-triazabicyclo[4.4.0]dec-5-ene. The above photopolymerization initiators may be used alone or in combination of 2 or more thereof.

The content of (C) is preferably 0.1 to 5.0% by mass relative to the entirety of (D). The content of (C) of 0.1% by mass or higher is preferable since (D) is sufficiently polymerized by irradiation with an active energy ray, the amount of (B) remaining in a support material obtained by curing is small, cured products have superior tensile strength, hardness, and elasticity, and in addition, the bleedout of (A) is suppressed. The content of (C) of 5% by mass or lower is also preferable since the pot life of (D) is elongated, problems such as gelatinization during storage do not occur. The content of (C) of 0.5 to 3% by mass is more preferable.

An active energy ray exposure dose (integrated light intensity) required to cure (D) is not particularly limited. The exposure dose varies in accordance with the type and addition amount of (A), (B), and a photopolymerization initiator that are used in (D), and the integrated light intensity is preferably 50 to 5,000 mJ/cm$^2$. The integrated light intensity of 50 mJ/cm$^2$ or higher is preferable since curing proceeds sufficiently, and cured products have superior tensile strength, hardness, elasticity, and molding accuracy. The integrated light intensity of 5,000 mJ/cm$^2$ or lower is also preferable since active energy ray irradiation time is reduced, resulting in improved productivity of three-dimensional production.

If needed, various additives (J) may be used in the active energy ray-curable resin composition (D) according to the present invention. Examples of the additives include thermal polymerization inhibitors, anti-aging agents, antioxidants, UV sensitizers, preservatives, flame retardants, surfactants, wetting and dispersing additives, antistatic agents, coloring agents, plasticizers, surface lubricants, levelling agents, softening agents, pigments, organic fillers, and inorganic fillers. The addition amount of the above resins and additives is not particularly limited as long as it does not adversely affect the properties exhibited by (D) and is preferably in a range of 5% by mass or lower relative to the entirety of (D).

Examples of thermal polymerization inhibitors include hydroquinone, p-methoxyphenol, 2,6-di-tert-butyl-p-cresol, 2,2,6,6-tetramethylpiperidine-1-oxyl, 4-hydroxy-2,2,6,6-tetramethylpyperidine-1-oxyl, phenothiazine, pyrogallol, and β-naphthol.

Examples of anti-aging agents include hindered phenolic compounds such as butylated hydroxytoluene and butylated hydroxyanisole, benzotriazole-based compounds, and hindered amine-based compounds.

Examples of surfactants include polyethylene oxide adducts of nonylphenol, acetylene-based glycol compound type nonionic surfactants, acetylene-based polyalkylene glycol compound type nonionic surfactants, fluorine-containing surfactants such as perfluoroalkyl polyethylene oxide adducts, perfluoroalkyl carboxylate, and perfluoroalkyl betaine, modified silicone oils such as polyether-modified silicone oil and (meth)acrylate-modified silicone oil, and amphoteric high molecular weight surfactants.

For a preferable method of using the active energy ray-curable resin composition (D) according to the present invention, the active energy ray-curable resin composition is irradiated with an active energy ray to be cured simultaneously with or immediately after formation of a predetermined shape pattern. More preferably, the method is such that the active energy ray-curable resin composition is used as a photocurable ink for a support material (E) that is ejected by inkjet and cured by active energy ray irradiation.

With regard to molding operability, the viscosity of (E) is preferably 1 to 2,000 mPa·s at a temperature of 25° C. Particularly in cases where (E) is ejected by an inkjet type, the viscosity of (E) is more preferably 1 to 200 mPa·s at a temperature of 25° C. with regard to stable ejection. The ejection temperature is preferably within a range of 20 to 100° C. If the ejection temperature is too high, the viscosity of (E) radically reduces, molding accuracy deteriorates, and at the same time, heat-induced denaturation and polymerization easily occur. Since ejection at a temperature lower than 80° C. is preferable with regard to thermal stability of (E), the viscosity of (E) is particularly preferably 100 mPa·s or lower.

A preferable method is such that fine droplets of (E) are ejected from an ink ejection nozzle by an inkjet type so as to draw a predetermined shape pattern, which is thereafter irradiated with an active energy ray to form a cured thin film. Specifically, by using an ink for a support material (E) and an ink for a model material (F), for example, (E) or (F) is ejected from an inkjet nozzle into a desired pattern based on the three-dimensional CAD data of an objective three-dimensional molded product to form a resin-thin film layer, which is simultaneously or thereafter cured by an active energy ray emitted from a light source. Subsequently, (E) and/or (F) is supplied onto the cured resin-thin film layer and a next thin film layer is formed and cured. (E) and (F) are continuously laminated to give a roughly molded product composed of a model material and a support material. (E) and (F) may be ejected from the same inkjet nozzle or from separate nozzles.

The support material according to the present invention is immersed in a washing liquid together with the obtained roughly molded product and is dissolved or dispersed in the washing liquid to be removed. Thereby a three-dimensional molded product is easily obtained. The roughly molded product may be washed by allowing it to stand in a washing liquid or by stirring the washing liquid, and ultrasonic washing is also possible. However, since there is the possibility that the three-dimensional molded product will be damaged when external force is applied due to stirring or ultrasonic waves, support material removal by still standing is preferable.

The washing liquid used for the removal of the support material according to the present invention is usually water, specifically tap water, pure water, ion exchanged water, or a similar liquid. Unless adversely affecting three-dimensional molded products, washing liquids such as an aqueous alkali solution, an electrolyte solution, and an organic solvent may also be used. Examples of aqueous alkaline solutions include aqueous solutions of alkali metal or alkali earth metal hydroxides such as an aqueous sodium hydroxide solution, an aqueous potassium hydroxide solution, and an aqueous calcium hydroxide solution; and examples of electrolyte solutions include aqueous solutions of electrolytes such as potassium carbonate, sodium carbonate, sodium bicarbonate, ammonia, and tetramethylammonium hydroxide. Examples of organic solvents include alcohols, ketones, alkylene glycols, polyalkylene glycols, glycol ethers, and glycol esters. The above water, aqueous alkaline solutions, electrolyte solutions, and organic solvents may be used alone or in combination of 2 or more thereof. In terms of safety, water is particularly preferable as the washing liquid.

The support material is preferably washed for 24 hours or shorter, and more preferably 10 hours or shorter. In terms of production efficiency, a washing time of 24 hours or shorter is preferable since a washing cycle can be repeated every day, which is efficient, and washing time of 10 hours or shorter is more preferable since a product molded during daytime is washed at night and the washing is completed the next day, which allows more efficient production. Further, a shorter washing time is preferable, since the shorter the washing time is, the higher the production efficiency will be, and a washing time of 3 hours or shorter is more preferable.

It is possible to set the washing temperature of a support material at any temperature between 0° C. and 100° C. However, when washing at a high temperature, there is the possibility that a resin forming a three-dimensional molded product may deform due to heat. On the other hand, dissolution, dispersion, or swelling of a support material advances more rapidly when the temperature is higher. Therefore, washing is more preferably performed at 10° C. or higher and 40° C. or lower.

The I/O value of the ink for a support material (E) according to the present invention is preferably 0.8 to 2.0. Within this range, the ink has an appropriate polarity, exhibits no corrosiveness of the three-dimensional molding apparatus such as a 3D printer, and simultaneously exhibits good washing properties in washing liquid such as water. With regard to highly accurate molding that enables the molding of sharp side surfaces and sharp corners by adjusting the balance with an ink for a model material, the I/O value of (E) is preferably 0.8 to 1.6, and particularly preferably 0.8 to 1.4.

The I/O value of the ink for a model material (F) according to the present invention is preferably 0.4 to 0.8. Within this range, the ink has low polarity, obtained molded products have good moisture resistance and durability, practical performance as daily necessaries, machine components, or similar objects is secured, and the ink-induced corrosion of three-dimensional molding apparatuses barely occurs. From the above viewpoints, the I/O value of the ink for a model material (F) is more preferably 0.5 to 0.7.

The ink set according to the present invention is composed of (E) and (F), and the difference in I/O values between (E) and (F) is preferably 0 to 1.6. When the difference in I/O values is within the range, the polarity difference from (E) is also within an appropriate range, problems such as the deterioration of molding accuracy or the deformation of molded products due to cissing of (E) and (F) can be avoided, (E) exhibits good support effects, and high molding accuracy is achieved. The difference in I/O values between (E) and (F) is more preferably 0.2 to 1.2, and particularly preferably 0.4 to 1.0.

Using the ink for a support material, ink for a model material, and ink set according to the present invention, large-sized and highly accurate molded products are obtained. The inks and ink set according to the present invention are suitably used as inks that are generally used for 3D printers having various structures. Moreover, the support material has good washing properties, and high safety of its waste liquid after washing is secured, making it easy to handle the inks and ink set in uses ranging from industrial to household applications.

EXAMPLES

Hereinafter, the present invention is more specifically described based on examples and comparative examples, but is not limited thereto. In the following, "parts" and "%" are all based on mass unless otherwise specified.

The abbreviations and I/O values of (A), (B), (C), and other compounds used in the examples and comparative examples are as described below.

(A) Non-Polymerizable Compounds
(a1) Amide Compounds
a1-3-1: β-dodecyloxy-N,N-dimethylpropionamide (I/O value 0.6)
a1-1-1: dimethylacetamide (I/O value 1.7)
a1-3-2: β-methoxy-N,N-dimethylpropionamide (I/O value 1.8)
a1-1-2: 9-octadeceneamide (I/O value 0.6)
a1-2-1: N-methylpyrrolidone (I/O value 1.5)
a1-3-3: β-butoxy-N,N-dimethylpropionamide (I/O value 1.2)
a1-1-3: N-bis(2-hydroxyethyl)dodecanamide (AMINON L-02, produced by KAO Corporation) (I/O value 1.1)
a1-2-2: N-methylcaprolactam (I/O value 1.0)
a1-4-1: 3-dimethylamino-N,N-diethylpropionamide (I/O value 1.6)
a1-3-4: β-octadecyloxy-N,N-dimethylpropionamide (I/O value 0.5)
(a2) Low Molecular Weight Compounds
a2-1: 2-butyl-2-ethyl-1,3-propanediol(butylethylpropanediol, produced by KH Neochem, Co., Ltd.) (melting point 44° C., I/O value 1.1)
a2-2: 1,8-octanediol (melting point 59° C., I/O value 1.3)
a2-3: 1,6-hexanediol (melting point 41° C., I/O value 1.7)
(a3) Oligomers, polymers
a3-1: homopolymer of N,N-dimethylacrylamide, Tg 119° C., number average molecular weight 2,100 (I/O value 1.4)

a3-2: homopolymer of N-vinylpyrrolidone (B-4), Tg 164° C., number average molecular weight 15,000 (I/O value 1.2)
a3-3: homopolymer of N,N-dimethylacrylamide, Tg 119° C., number average molecular weight 45,000 (I/O value 1.4)
a3-4: copolymer of N,N-dimethylacrylamide and hydroxyethyl methacrylate (molar ratio 4:1), Tg 101° C., number average molecular weight 5,000 (I/O value 1.4)
a3-5: copolymer of N,N-dimethylacrylamide and tetrahydrofurfuryl acrylate (molar ratio 19:1), Tg 119° C., number average molecular weight 18,000 (I/O value 1.4)
a3-6: homopolymer of N,N-isopropylacrylamide, Tg 134° C., number average molecular weight 12,000 (I/O value 1.8)
a3-7: copolymer of hydroxyethyl methacrylate and hydroxyethyl acrylate (molar ratio 3:2), Tg 21° C., number average molecular weight 12,000 (I/O value 1.4)
a3-8: homopolymer of N-acryloylmorpholine, Tg 145° C., number average molecular weight 14,000 (I/O value 1.2)
a3-9: homopolymer of N,N-diethylacrylamide, Tg 81° C., number average molecular weight 8,000 (I/O value 1.0)
(a4) Alcohols
a4-1: polyethylene glycol oleyl ether (PEG average molecular weight 220, NONION E-205, produced by NOF Corporation) (melting point 4° C., I/O value 0.9)
a4-2: polyethylene glycol stearyl ether (PEG average molecular weight 650, NONION S-215, produced by NOF Corporation) (melting point 40° C., I/O value 1.3)
a4-3: diethylene glycol mono-2-ethylhexyl ether (KYOWANOL OX20, produced by KH Neochem, Co., Ltd.) (melting point −80° C., I/O value 1.0)
a4-4: sorbitan monolaurate (NONION LP-20R, produced by NOF Corporation) (melting point 13° C., I/O value 1.1)
a4-5: polyethylene glycol lauryl ether (PEG average molecular weight 880, NONION K-220, produced by NOF Corporation) (Melting point 40° C., I/O value 1.5)
a4-6: glyceryl monolaurate ester (melting point 40° C., I/O value 0.9)
a4-7: sorbitan monooleate (NONION OP-80R, produced by NOF Corporation) (melting point 5° C., I/O value 0.8)
a4-8: polyethylene glycol oleyl ether (PEG average molecular weight 1,320, NONION E-230, produced by NOF Corporation) (melting point 40° C., I/O value 1.5)
(B) Polymerizable Compounds
B-1: N-acryloylmorpholine (registered tradename ACMO, registered tradename Kohshylmer, produced by KJ Chemicals Corporation) (I/O value 1.2)
B-2: UNIOX PKA-5009 (PEG average molecular weight 550, methoxypolyethylene glycol monoallylether, produced by NOF Corporation) (I/O value 1.2)
B-3: N-(2-hydroxyethyl)acrylamide (registered tradename HEAA, registered tradename Kohshylmer, produced by KJ Chemicals Corporation) (I/O value 3.0)
B-4: N-vinylpyrrolidone (I/O value 1.2)
B-5: N-(2-hydroxyethyl)maleimide (I/O value 2.6)
B-6: methoxy polyethylene glycol monoacrylate (PEG average molecular weight 400, NK ESTER AM90G produced by Shin-Nakamura Chemical Co., Ltd.) (I/O value 1.7)
B-7: N,N-dimethylacrylamide (registered tradename DMAA, registered tradename Kohshylmer, produced by KJ Chemicals Corporation) (I/O value 1.4)
(C) Photopolymerization Initiators
C-1: Omnirad 184 (1-hydroxy-cyclohexyl-phenyl-ketone, produced by IGM Resins B.V.)
C-2: Omnirad TPO (2,4,6-trimethylbenzoyl-diphenyl-phosphine oxide, produced by IGM Resins B.V.)
C-3: Omnirad 819 (bis(2,4,6-trimethylbenzoyl)-phenylphosphine oxide, produced by IGM Resins B.V.)
C-4: Omnirad 2959 (1-[4-(2-hydroxyethoxy)-phenyl]-2-hydroxy-2-methyl-1-propan-1-one, produced by IGM Resins B.V.)

(J) Other Additives
J-1: (4-hydroxy-2,2,6,6-tetramethyl-1-piperidinyloxy) radical
J-2: acryloyl aminomethyl trimethyl ammonium bis(trifluoromethanesulfonyl)imide
J-3: SURFYNOL 440 (produced by Air Products Japan)
J-4: BYK 307 (polyether-modified polydimethylsiloxane, produced by BYK Chemie Japan, K.K.)
J-5: EMANON 1112 (polyethylene oxide laurate (12 E.O.) adduct, produced by KAO Corporation)
J-6: TEGO-Rad 2100 (silicon acrylate having a polydimethyl siloxane structure, produced by Evonik Degussa)
J-7: phenothiazine
Others:
OD: 2-ethyl-1,3-hexanediol (octanediol, produced by KH Neochem, Co., Ltd.) (melting point −40° C., I/O value 1.3)
DMF: dimethylformamide (I/O value 2.2)
PEG200: polyethylene glycol having a number average molecular weight of 200 (I/O value 2.7)
TGM: triethylene glycol monomethyl ether (I/O value 2.3)
PEG1000: polyethylene glycol having a number average molecular weight of 1,000 (I/O value 2.0)
PG: 1,2-propyleneglycol (I/O value 3.3)
EDG: diethylene glycol ethyl ether (I/O value 2.1)
THFA: tetrahydrofurfuryl acrylate (I/O value 0.6)
TBCHA: t-butylcyclohexyl acrylate (registered tradename Kohshylmer TBCHA, produced by KJ Chemicals Corporation) (I/O value 0.3)
IBXA: isobornyl acrylate (I/O value 0.3)
PEA: phenoxyethyl acrylate (I/O value 0.4)
Ebe150: modified bisphenol A diacrylate (EBECRYL 150, produced by Daicel Allnex Ltd.) (I/O value 0.8)
ADCP: tricyclodecanedimethanol diacrylate (NK ESTER A-DCP, produced by Shin-Nakamura Chemical Co., Ltd.) (I/O value 0.4)
CN991: polyester urethane acrylate (produced by Arkema K.K., number average molecular weight: 3,000) (I/O value 0.9)
CN996: polyetherurethane acrylate (produced by Arkema K.K., number average molecular weight: 4,500) (I/O value 0.7)
A-600: polyethylene glycol diacrylate (PEG average molecular weight 400) (NK ESTER A-600, produced by Shin-Nakamura Chemical Co., Ltd.) (I/O value 1.6)

With respect to the oligomers and polymers (a3), the number average molecular weight was measured by means of high-performance liquid chromatography (using LC-10A produced by Shimadzu Corporation, a column Shodex GPC KF-806L (exclusion limit molecular weight: $2 \times 10^7$, separation range: 100 to $2 \times 10^7$, number of theoretical plates: 10,000 plates/unit, filler material: styrene-divinyl benzene copolymer, filler particle diameter: 10 μm) using tetrahydrofuran as an eluent), and was calculated in terms of standard polystyrene molecular weight.

Example 1 Preparation of Active Energy Ray-Curable Resin Composition (D-1)

(a2-1) 0.1 parts by mass, (B-1) 50.0 parts by mass, (B-2) 49.0 parts by mass and (C-1) 0.9 parts by mass were each fed into a container and stirred at a temperature of 25° C. for 1 hour to give a homogeneous and transparent active energy ray-curable resin composition (D-1).

Preparation of Examples 2 to 24 as active energy ray-curable resin compositions (D-2) to (D-24) and preparation of Comparative Examples 1 to 5 as active energy ray-curable resin compositions (G-1) to (G-5)

Based on the compositions summarized in Table 1, the same operation as the one described in Example 1 was performed to give active energy ray-curable resin compositions (D-2) to (D-24) as Examples 2 to 24 and active energy ray-curable resin compositions (G-1) to (G-5) as Comparative Examples 1 to 5.

TABLE 1

| Resin composition | | (A) parts by mass | | (B) parts by mass | | (C) parts by mass | | Others | | (J) parts by mass | | I/O value |
|---|---|---|---|---|---|---|---|---|---|---|---|---|
| Example 1 | D-1 | a2-1 | 0.1 | B-1 | 50 | C-1 | 0.9 | — | — | — | — | 1.2 |
|  |  |  |  | B-2 | 49 |  |  |  |  |  |  |  |
| Example 2 | D-2 | a2-1 | 69 | B-1 | 10 | C-1 | 1 | — | — | — | — | 1.2 |
|  |  | a3-1 | 20 |  |  |  |  |  |  |  |  |  |
| Example 3 | D-3 | a1-3-1 | 70 | B-1 | 20 | C-1 | 1 | — | — | — | — | 0.8 |
|  |  | a1-1-1 | 9 |  |  |  |  |  |  |  |  |  |
| Example 4 | D-4 | a1-3-2 | 5 | B-1 | 94.9 | C-1 | 0.1 | — | — | — | — | 1.2 |
| Example 5 | D-5 | a3-1 | 10 | B-1 | 40 | C-2 | 5 | — | — | — | — | 1.2 |
|  |  |  |  | B-2 | 45 |  |  |  |  |  |  |  |
| Example 6 | D-6 | a4-1 | 40 | B-1 | 59 | C-2 | 1 | — | — | — | — | 1.1 |
| Example 7 | D-7 | a1-1-1 | 20 | B-1 | 50 | C-2 | 1 | EDG | 9 | — | — | 1.6 |
|  |  | a3-2 | 10 | B-3 | 10 |  |  |  |  |  |  |  |
| Example 8 | D-8 | a1-3-1 | 16 | B-1 | 70 | C-1 | 3 | — | — | J-1 | 0.1 | 1.0 |
|  |  | a1-1-2 | 9.9 |  |  |  |  |  |  |  |  |  |
|  |  | a3-3 | 1 |  |  |  |  |  |  |  |  |  |
| Example 9 | D-9 | a1-3-2 | 30 | B-1 | 28 | C-2 | 1 | — | — | J-2 | 1 | 1.4 |
|  |  | a2-2 | 40 |  |  |  |  |  |  |  |  |  |
| Example 10 | D-10 | a1-2-1 | 10 | B-1 | 70 | C-3 | 0.5 | — | — | — | — | 1.2 |
|  |  | a2-1 | 5 |  |  |  |  |  |  |  |  |  |
|  |  | a3-4 | 4.5 | B-4 | 10 |  |  |  |  |  |  |  |
| Example 11 | D-11 | a1-3-3 | 48.5 | B-1 | 20 | C-1 | 1 | — | — | J-3 | 0.5 | 1.2 |
|  |  | a3-1 | 30 |  |  |  |  |  |  |  |  |  |
| Example 12 | D-12 | a1-3-2 | 18 | B-1 | 40 | C-1 | 2 | — | — | — | — | 1.4 |
|  |  | a1-1-2 | 10 |  |  |  |  |  |  |  |  |  |
|  |  | a2-3 | 30 |  |  |  |  |  |  |  |  |  |
| Example 13 | D-13 | a1-3-1 | 50 | B-3 | 35 | C-1 | 0.5 | — | — | — | — | 1.5 |
|  |  | a1-2-2 | 10 |  |  |  |  |  |  |  |  |  |
|  |  | a3-5 | 4.5 |  |  |  |  |  |  |  |  |  |
| Example 14 | D-14 | a1-3-1 | 1 | B-1 | 30 | C-1 | 3 | — | — | — | — | 1.1 |
|  |  | a4-1 | 50 |  |  |  |  |  |  |  |  |  |
|  |  | a3-6 | 16 |  |  |  |  |  |  |  |  |  |
| Example 15 | D-15 | a1-1-1 | 10 | B-1 | 45 | C-4 | 0.5 | — | — | — | — | 1.3 |
|  |  | a1-4-1 | 10 |  |  |  |  |  |  |  |  |  |
|  |  | a4-2 | 14 |  |  |  |  |  |  |  |  |  |
|  |  | a4-3 | 20 |  |  |  |  |  |  |  |  |  |
|  |  | a3-7 | 0.5 |  |  |  |  |  |  |  |  |  |
| Example 16 | D-16 | a1-3-2 | 20 | B-3 | 35 | C-4 | 1 | — | — | — | — | 2.0 |
|  |  | a4-4 | 24 |  |  |  |  |  |  |  |  |  |
|  |  | a3-1 | 20 |  |  |  |  |  |  |  |  |  |
| Example 17 | D-17 | a1-3-2 | 19 | B-1 | 50 | C-1 | 5 | — | — | J-4 | 0.5 | 1.3 |
|  |  | a2-1 | 0.5 |  |  |  |  |  |  |  |  |  |
|  |  | a3-1 | 25 |  |  |  |  |  |  |  |  |  |
| Example 18 | D-18 | a1-3-2 | 20 | B-1 | 50 | — | — | — | — | J-1 | 0.1 | 1.4 |
|  |  | a2-1 | 14.9 | B-5 | 10 |  |  |  |  |  |  |  |
|  |  | a3-5 | 5 |  |  |  |  |  |  |  |  |  |
| Example 19 | D-19 | a1-3-1 | 15 | B-1 | 45 | C-1 | 1 | TGM | 13 | J-5 | 1 | 1.3 |
|  |  | a1-3-2 | 15 | B-6 | 5 |  |  |  |  |  |  |  |
|  |  | a3-1 | 10 |  |  |  |  |  |  |  |  |  |
| Example 20 | D-20 | a1-3-3 | 25 | B-1 | 40 | C-2 | 2 | — | — | J-6 | 0.5 | 1.2 |
|  |  | a4-3 | 15 | B-7 | 17.5 |  |  |  |  |  |  |  |
| Example 21 | D-21 | a1-3-3 | 14 | B-1 | 40 | C-2 | 1 | OD | 9.9 | J-1 | 0.1 | 1.3 |
|  |  | a4-5 | 35 |  |  |  |  |  |  |  |  |  |
| Example 22 | D-22 | a1-3-1 | 15 | B-1 | 50 | C-1 | 1.5 | — | — | — | — | 1.1 |
|  |  | a1-3-2 | 10 |  |  | C-2 | 1.5 |  |  |  |  |  |
|  |  | a4-1 | 5 |  |  |  |  |  |  |  |  |  |
|  |  | a4-6 | 10 |  |  |  |  |  |  |  |  |  |
|  |  | a3-8 | 7 |  |  |  |  |  |  |  |  |  |
| Example 23 | D-23 | a1-3-4 | 8 | B-1 | 55 | C-1 | 2 | — | — | J-1 | 0.1 | 1.0 |
|  |  | a4-7 | 29.9 |  |  |  |  |  |  |  |  |  |
|  |  | a3-9 | 5 |  |  |  |  |  |  |  |  |  |
| Example 24 | D-24 | a1-3-2 | 7 | B-1 | 40 | C-2 | 3 | — | — | J-1 | 0.1 | 1.3 |
|  |  | a4-8 | 40 |  |  |  |  |  |  |  |  |  |
|  |  | a3-9 | 9.9 |  |  |  |  |  |  |  |  |  |
| Comparative Example 1 | G-1 | — | — | B-1 | 20 | C-2 | 3 | DMF | 57 | — | — | 2.2 |
|  |  |  |  | B-3 | 20 |  |  |  |  |  |  |  |
| Comparative Example 2 | G-2 | — | — | B-1 | 40 | C-2 | 3 | PEG200 | 57 | — | — | 2.1 |
| Comparative Example 3 | G-3 | — | — | B-3 | 40 | C-2 | 3 | TGM | 47 | — | — | 2.6 |
|  |  |  |  |  |  |  |  | PEG1000 | 10 |  |  |  |
| Comparative Example 4 | G-4 | — | — | B-1 | 40 | C-2 | 3 | PG | 30 | — | — | 2.1 |
|  |  |  |  |  |  |  |  | EDG | 27 |  |  |  |
| Comparative Example 5 | G-5 | a1-3-2 | 7 | — | — | C-2 | 3 | THFA | 40 | J-1 | 0.1 | 1.1 |
|  |  | a4-8 | 40 |  |  |  |  |  |  |  |  |  |
|  |  | a3-9 | 9.9 |  |  |  |  |  |  |  |  |  |

The active energy ray-curable resin compositions obtained in Examples 1 to 24 and Comparative Examples 1 to 5 were used as inks for a support material to perform three-dimensional molding in Examples 25 to 48 and Comparative Examples 6 to 10. The physical properties of the inks and support materials obtained after curing were evaluated by the methods below. The results are summarized in Table 2. The evaluation methods are as described below.

Viscosity Measurement

With respect to the inks for a support material used in Examples and Comparative Examples, viscosity was measured with a cone plate type viscometer (name of apparatus: RE-550 viscometer, produced by Toki Sangyo Co., Ltd.) in accordance with JIS K5600-2-3 at a temperature of 25° C.

Corrosiveness

With a bar coater, 40 g of each of the inks for a support material of Examples and Comparative Examples was collected in a 50 mL beaker and a 10×20×2 mm aluminum substrate (A1, A5052) was immersed in each of the inks for a support material. Thereafter, the beaker was allowed to stand in a thermo-hygrostat adjusted so as to have a temperature of 60° C. and the relative humidity of 95% for 500 hours. The aluminum substrate was subsequently removed from the ink for a support material and the surface of the aluminum substrate was visually observed to evaluate corrosiveness. The results are summarized in Table 2.

(++): No corrosion observed
(+): Very slight corrosion observed
(+−): Slight corrosion observed
(−) Corrosion observed Support Properties On a horizontally laid polymethylmethacrylate plate (PMMA plate) with a thickness of 1 mm, a cylindrical spacer with a thickness of 10 mm and an internal diameter of 20 mm was placed, 0.3 g of each of the inks for a support material of Examples and Comparative Examples was filled into the inside of the spacer, and was irradiated with a UV ray (apparatus: Inverter type conveyer system ECS-4011GX produced by Eye Graphics Co., Ltd., metal halide lamp: M04-L41 produced by Eye Graphics Co., Ltd., UV illuminance: 300 mW/cm$^2$, integrated light intensity: 1,000 mJ/cm$^2$) to obtain a cured thin film. Onto the thin film thus obtained, 0.3 g of the ink for a support material was added and similarly cured by UV ray irradiation, and thereby thin film lamination was performed. The same work was subsequently repeated to give a support material consisting of thin films laminated up to a thickness of 10 mm. Thereafter the Shore A hardness of the support material thus obtained was measured at room temperature (25° C.) to evaluate the support properties as described below.

(++): Good support properties (Shore A hardness ≥80)
(+): Sufficient support properties (80> Shore A hardness 60)
(+−): Support properties to some extent, but insufficient (60> Shore A hardness ≥40)
(−): No support properties (40> Shore A hardness)

Moisture Resistance

Onto a horizontally laid glass plate, a PET release film with a heavy release property (Polyester film E7001, produced by Toyobo, Co., Ltd.) having a thickness of 75 μm was tightly adhered, a spacer having a thickness of 1 mm with an internal size of 50 mm×20 mm was placed, each of the inks for a support material of Examples and Comparative Examples was filled into the inside of the spacer, subsequently a PET release film with a light release property (polyester film E7002, produced by Toyobo, Co., Ltd.) having a thickness of 50 μm was further superimposed thereon, and the object was similarly irradiated with a UV ray to cure the ink for a support material. Thereafter, a cured product prepared by removing the PET release films on both sides was used as a test specimen and was allowed to stand in a thermo-hygrostat adjusted so as to have a temperature of 25° C. and a relative humidity of 50% for 24 hours. The test specimen surface was visually evaluated before and after still standing.

(++): Cured product after still standing did not cause moisture absorption-induced deformation.
(+): Cured product after still standing slightly caused moisture absorption-induced bleedout but caused nearly no deformation.
(+−): Cured product after still standing caused moisture absorption-induced bleedout to some extent and slightly caused deformation.
(−): Cured product after still standing was dissolved due to moisture absorption, and caused deformation.

Washing Properties

On a horizontally laid PMMA plate with a thickness of 1 mm, a spacer having a thickness of 1 mm with an internal size of 50 mm×40 mm was placed. Into the inside of the spacer, 1 g of "LH 100 white" produced by Mimaki Engineering, Co., Ltd., as a curable resin composition before photocuring that formed a model material and 1 g of each of the inks for a support material of Examples and Comparative Examples were filled so as to be in contact with each other, and thereafter UV ray irradiation was similarly performed to give a roughly molded product. Thereafter, the roughly molded product thus obtained and the PMMA plate were immersed together in ion exchanged water as a washing liquid at room temperature (25° C.) and after the support material was dissolved or dispersed in water and was removed from the model material and the PMMA plate, the state of the model material and the PMMA plate was observed and the washing properties were evaluated by the following methods.

(++): Support material was completely removed in less than 3 hours and oily residue was observed neither in the washing liquid nor on the PMMA plate surface.
(+): Support material was completely removed in 3 to less than 10 hours and oily residue was observed neither in the washing liquid nor on the PMMA plate surface.
(+−): Support material was removed in 3 to less than 24 hours but oily residue was observed in the washing liquid or on the PMMA plate surface to some extent.
(−): Support material was partly remained after 24 hours.

TABLE 2

| | | | Physical properties of inks for support material | | | Physical properties of support material after curing | | |
|---|---|---|---|---|---|---|---|---|
| | Inks for support material | | Resin compositions | Viscosity (mPa · s 25° C.) | Corrosiveness | Support properties | Moisture resistance | Washing properties |
| Example 25 | E-1 | | D-1 | 50 | ++ | + | +− | +− |
| Example 26 | E-2 | | D-2 | 96 | ++ | +− | + | + |

TABLE 2-continued

| Inks for support material | | Physical properties of inks for support material | | | Physical properties of support material after curing | | |
|---|---|---|---|---|---|---|---|
| | Resin compositions | Viscosity (mPa·s 25° C.) | Corrosiveness | Support properties | Moisture resistance | Washing properties | |
| Example 27 | E-3 | D-3 | 15 | ++ | +− | + | + |
| Example 28 | E-4 | D-4 | 10 | ++ | + | + | +− |
| Example 29 | E-5 | D-5 | 76 | + | + | +− | ++ |
| Example 30 | E-6 | D-6 | 30 | ++ | +− | + | ++ |
| Example 31 | E-7 | D-7 | 85 | + | ++ | +− | + |
| Example 32 | E-8 | D-8 | 46 | ++ | ++ | ++ | +− |
| Example 33 | E-9 | D-9 | 45 | ++ | + | + | + |
| Example 34 | E-10 | D-10 | 78 | ++ | + | + | + |
| Example 35 | E-11 | D-11 | 932 | ++ | + | + | + |
| Example 36 | E-12 | D-12 | 92 | ++ | + | ++ | + |
| Example 37 | E-13 | D-13 | 20 | + | + | + | ++ |
| Example 38 | E-14 | D-14 | 56 | ++ | + | ++ | ++ |
| Example 39 | E-15 | D-15 | 85 | ++ | ++ | + | ++ |
| Example 40 | E-16 | D-16 | 60 | +− | + | ++ | ++ |
| Example 41 | E-17 | D-17 | 98 | ++ | ++ | ++ | + |
| Example 42 | E-18 | D-18 | 48 | + | ++ | + | ++ |
| Example 43 | E-19 | D-19 | 53 | ++ | ++ | ++ | + |
| Example 44 | E-20 | D-20 | 45 | ++ | ++ | ++ | + |
| Example 45 | E-21 | D-21 | 58 | ++ | + | ++ | ++ |
| Example 46 | E-22 | D-22 | 65 | ++ | ++ | ++ | ++ |
| Example 47 | E-23 | D-23 | 40 | ++ | ++ | ++ | ++ |
| Example 48 | E-24 | D-24 | 70 | ++ | ++ | ++ | ++ |
| Comparative Example 6 | H-1 | G-1 | 55 | − | +− | − | + |
| Comparative Example 7 | H-2 | G-2 | 30 | − | − | − | + |
| Comparative Example 8 | H-3 | G-3 | 90 | − | +− | +− | +− |
| Comparative Example 9 | H-4 | G-4 | 66 | − | +− | − | + |
| Comparative Example 10 | H-5 | G-5 | 40 | ++ | ++ | ++ | − |

As can be seen from the results summarized in Table 2, the inks for a support material of Examples 25 to 48 had a viscosity of 1,000 mPa·s or lower at a temperature of 25° C. and exhibited excellent ink ejection operability. Particularly the inks for a support material except for the ink of Example 35 had a viscosity of 100 mPa·s or lower and exhibited good injection properties as inkjet inks. The inks of Examples did not exhibit corrosiveness, but corrosion was observed when the inks of Comparative Examples were used. With respect to the support materials after curing, those obtained in Examples had sufficient hardness and moisture resistance and exhibited good support properties and simultaneously good washing properties in water. In contrast, the support materials obtained in Comparative Examples did not completely satisfy the requirements for the physical properties of inks and for the performance after curing since the I/O values of (A) and/or (B) were not included in the ranges specified in the present invention. Corrosion was observed particularly in Comparative Examples 8 to 10 in which the I/O value of the ink for a support material exceeded 2.0, due to too high polarity of the inks.

Table 3 shows compositions and I/O values of the inks for a model material of Examples 49 to 51 according to the present invention and of a comparative example.

TABLE 3

| Inks for model material | | Composition of polymerizable compounds | | (C) parts by mass | | (J) parts by mass | | I/O value |
|---|---|---|---|---|---|---|---|---|
| Example 49 | F-1 | TBCHA | 60 | C-2 | 4.6 | J-1 | 0.3 | 0.4 |
| | | Ebe150 | 25 | | | J-6 | 0.1 | |
| | | ADCP | 10 | | | | | |
| Example 50 | F-2 | IBXA | 10 | C-2 | 4.6 | J-1 | 0.3 | 0.6 |
| | | PEA | 50 | | | J-6 | 0.1 | |
| | | CN991 | 35 | | | | | |
| Example 51 | F-3 | ACMO | 35 | C-2 | 4.6 | J-1 | 0.3 | 0.8 |
| | | PEA | 30 | | | J-6 | 0.1 | |
| | | CN996 | 30 | | | | | |
| Comparative Example 11 | I-1 | ACMO | 40 | C-2 | 4.6 | J-1 | 0.3 | 1.1 |
| | | PEA | 30 | | | J-6 | 0.1 | |
| | | A-600 | 25 | | | | | |

The three-dimensional molding ink sets according to the present invention were obtained by combining the inks for a support material (E) and the inks for a model material (F) according to the present invention. Three-dimensional molding was performed by using the ink sets of Examples 52 to 75 and Comparative Examples 12 to 19 shown in Table 4, and the moldability was evaluated. The results are summarized in the table.

Moldability

On a horizontally laid PMMA plate with a thickness of 1 mm, a cylindrical spacer with a thickness of 2 mm and an internal diameter of 20 mm was placed, an ink for a support material was filled into the inside of the spacer up to a height of 1 mm, and was similarly irradiated with a UV ray to give a support material as a support. Thereafter, an ink for a support material and an ink for a model material were simultaneously filled into the inside of the spacer from left and right up to a height of 2 mm on the support material, and were similarly irradiated with a UV ray to give a roughly molded product in which a hemicylindrical support material and a hemicylindrical model material were formed on the support. The spacer was thereafter removed, and the obtained roughly molded product was immersed with the PMMA plate in ion exchanged water as a washing liquid at room temperature (25° C.). After the support material was dissolved or dispersed in water and was removed from the model material and the PMMA plate, the state of the three-dimensional molded product formed from the model material was observed and the moldability was evaluated by the following standards.

(++): Hemicylindrical three-dimensional molded product was obtained, the support material contact surfaces of the three-dimensional molded product were smooth, and sharp corners were formed.

(+): Hemicylindrical three-dimensional molded product was obtained, the support material contact surfaces of the three-dimensional molded product were smooth, but corners were slightly rounded.

(+−): Hemicylindrical three-dimensional molded product was obtained, but the support material contact surfaces of the three-dimensional molded product were slightly rounded and corners were also rounded.

(−): An ink for a support material and an ink for a model material were mixed on the contact surfaces and a target hemicylindrical three-dimensional molded product was not obtained.

As can be seen from the results summarized in Table 4, when the ink sets of Examples 55 to 78 were used, molded products as designed with sharp side surfaces and sharp corners were obtained, and highly accurate molding was performed. In addition, the results show that the moldability (molding accuracy) was highest when the difference in I/O values between (E) and (F) was 0.4 to 1.0, and the moldability deteriorated as the difference increased. Further, when the difference in I/O values between (E) and (F) was 1.6 or more, almost no molded product as designed was obtained as shown in Comparative Examples 13 and 14.

TABLE 4

| Evaluation of moldability | Inks for support material | I/O value | Inks for model material | I/O value | I/O value difference | Moldability |
|---|---|---|---|---|---|---|
| Example 52 | E-1 | 1.2 | F-1 | 0.4 | 0.8 | ++ |
| Example 53 | E-2 | 1.2 | F-2 | 0.6 | 0.6 | ++ |
| Example 54 | E-3 | 0.8 | F-3 | 0.8 | 0.0 | +− |
| Example 55 | E-4 | 1.2 | F-3 | 0.8 | 0.4 | ++ |
| Example 56 | E-5 | 1.2 | F-2 | 0.6 | 0.6 | ++ |
| Example 57 | E-6 | 1.1 | F-2 | 0.6 | 0.5 | ++ |
| Example 58 | E-7 | 1.6 | F-1 | 0.4 | 1.2 | + |
| Example 59 | E-8 | 1.0 | F-2 | 0.6 | 0.4 | ++ |
| Example 60 | E-9 | 1.4 | F-1 | 0.4 | 1.0 | ++ |
| Example 61 | E-10 | 1.2 | F-2 | 0.6 | 0.6 | ++ |
| Example 62 | E-11 | 1.2 | F-2 | 0.6 | 0.6 | ++ |
| Example 63 | E-12 | 1.4 | F-3 | 0.8 | 0.6 | ++ |
| Example 64 | E-13 | 1.5 | F-3 | 0.8 | 0.7 | ++ |
| Example 65 | E-14 | 1.1 | F-3 | 0.8 | 0.3 | + |
| Example 66 | E-15 | 1.3 | F-2 | 0.6 | 0.7 | ++ |
| Example 67 | E-16 | 2.0 | F-1 | 0.4 | 1.6 | +− |
| Example 68 | E-17 | 1.3 | F-2 | 0.6 | 0.7 | ++ |
| Example 69 | E-18 | 1.4 | F-2 | 0.6 | 0.8 | ++ |
| Example 70 | E-19 | 1.3 | F-3 | 0.8 | 0.5 | ++ |
| Example 71 | E-20 | 1.2 | F-2 | 0.6 | 0.6 | ++ |
| Example 72 | E-21 | 1.3 | F-2 | 0.6 | 0.7 | ++ |
| Example 73 | E-22 | 1.1 | F-1 | 0.4 | 0.7 | ++ |
| Example 74 | E-23 | 1.0 | F-1 | 0.4 | 0.6 | ++ |
| Example 75 | E-24 | 1.3 | F-1 | 0.4 | 0.9 | ++ |
| Comparative Example 12 | H-1 | 2.2 | F-1 | 0.4 | 1.8 | − |
| Comparative Example 13 | H-2 | 2.1 | F-1 | 0.4 | 1.7 | − |
| Comparative Example 14 | H-3 | 2.6 | F-3 | 0.8 | 1.8 | − |
| Comparative Example 15 | H-4 | 2.1 | F-1 | 0.4 | 1.7 | − |
| Comparative Example 16 | H-5 | 1.1 | I-1 | 1.1 | 0.0 | +− |
| Comparative Example 17 | E-3 | 0.8 | I-1 | 1.1 | −0.3 | − |
| Comparative Example 18 | E-8 | 1.0 | I-1 | 1.1 | −0.1 | − |
| Comparative Example 19 | E-23 | 1.0 | I-1 | 1.1 | −0.1 | − |

INDUSTRIAL APPLICABILITY

As described above, the active energy ray-curable resin composition according to the present invention has a specific I/O value and is suitably used in forming a support material for three-dimensional molding. The active energy ray-curable resin composition and ink for a support material according to the present invention have low viscosity and excellent operability, do not cause corrosion of a molding apparatus, and is usable as a photocurable ink for a support material used in three-dimensional molding with a photocurable inkjet type 3D printer. Moreover, when a roughly molded product in which a three-dimensional molded product is supported by the support material according to the present invention is immersed in a washing liquid, the support material is efficiently removed, a finishing step is unnecessary, and a highly accurate and large-sized three-dimensional molded product is obtained.

In addition, a support material formed by using an ink for a support material containing the active energy ray-curable resin composition according to the present invention has good support properties and excellent washing properties, and it is also suitable for long-time molding and large-sized product molding due to its high moisture resistance. Moreover, by using an ink set obtained by combining the ink for a support material and the ink for a model material according to the present invention, three-dimensional molding with high moldability is effectuated and a highly accurate molded product with sharp side surfaces and sharp corners is obtained. The active energy ray-curable resin composition, ink for a support material, ink for a model material, and ink set according to the present invention are preferably used in large-scaled and high-speed molding with high resolution and high performance by using 3D printers having various structures, particularly a photocurable inkjet type 3D printer.

The invention claimed is:

1. An active energy ray-curable resin composition for three-dimensional molding support materials, comprising 0.1 to 90% by mass of a non-polymerizable compound (A) in which inorganic groups/organic groups (I/O value) equals 0.4 to 1.8 and 10 to 99.9% by mass of a polymerizable compound (B) in which inorganic groups/organic groups (I/O value) equals 0.8 to 3.0.

2. The active energy ray-curable resin composition according to claim 1, wherein (A) is an amide compound (a1) having one or more amide groups in a molecule.

3. The active energy ray-curable resin composition according to claim 1, wherein (A) is at least one compound selected from (a1-1) N-substituted amides and N,N-disubstituted amides represented by a general formula (1), (a1-2) N-substituted lactams represented by a general formula (2), (a1-3) β-alkoxy-N-substituted propionamides and β-alkoxy-N,N-disubstituted propionamides represented by a general formula (3), and (a1-4) β-amino-N-substituted propionamides and β-amino-N,N-disubstituted propionamides represented by a general formula (4):

[Chemical formula 1]

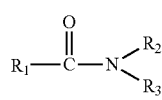

General formula (1)

[Chemical formula 2]

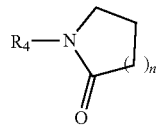

General formula (2)

[Chemical formula 3]

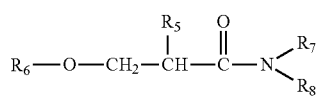

General formula (3)

[Chemical formula 4]

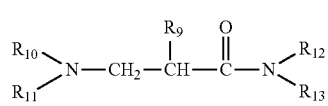

General formula (4)

(wherein $R_1$ to $R_4$ each independently represent a hydrogen atom or a $C_1$ to $C_{18}$ linear, branched, or cyclic aliphatic hydrocarbon, a hydroxy group-containing aliphatic hydrocarbon, or an aromatic hydrocarbon (excluding the case where $R_1$, $R_2$, and $R_3$ are simultaneously hydrogen atoms and the case where $R_4$ is a hydrogen atom), $R_5$ and $R_9$ represent a hydrogen atom or a methyl group, $R_6$ to $R_8$, $R_{10}$ to $R_{13}$ each independently represent a hydrogen atom or a $C_1$ to $C_{18}$ linear, branched, or cyclic aliphatic hydrocarbon, a hydroxy group-containing aliphatic hydrocarbon, or an aromatic hydrocarbon (excluding the case where $R_7$ and $R_8$ are simultaneously hydrogen atoms, the case where $R_{10}$ and $R_{11}$ are hydrogen atoms, and the case where $R_{12}$ and $R_{13}$ are simultaneously hydrogen atoms, and including the case where $R_2$ and $R_3$, $R_7$ and $R_8$, $R_{10}$ and $R_{11}$, or $R_{12}$ and $R_{13}$ form a saturated 5- to 7-membered ring (including an oxygen atom-containing ring) together with a nitrogen atom carrying them), and n in the general formula (2) represents an integer of 1 to 3).

4. The active energy ray-curable resin composition according to claim 1, wherein (A) is at least one compound selected from (a1-5) β-alkoxy-N-substituted propionamides and β-alkoxy-N,N-disubstituted propionamides represented by a general formula (5):

[Chemical formula 5]

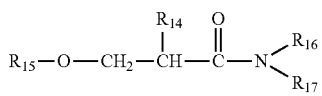

General formula (5)

(wherein $R_{14}$ represents a hydrogen atom or a methyl group, $R_{15}$ represents a $C_1$ to $C_{18}$ linear or branched alkyl group, $R_{16}$ and $R_{17}$ each independently represent a hydrogen atom or a $C_1$ to $C_6$ linear or branched alkyl group (excluding the case where $R_{16}$ and $R_{17}$ are simultaneously hydrogen atoms, and including the case where $R_{16}$ and $R_{17}$ form a saturated 5- to 7-membered ring (including an oxygen atom-containing ring) together with a nitrogen atom carrying them).

5. The active energy ray-curable resin composition according to claim 1, wherein (A) is a low molecular weight compound (a2) having a melting point or a softening point of 0° C. or higher and a molecular weight of less than 2,000.

6. The active energy ray-curable resin composition according to claim 1, wherein (A) is an oligomer and/or a polymer (a3) having a glass transition temperature (Tg) of 20° C. or higher and a molecular weight of 2,000 or higher.

7. The active energy ray-curable resin composition according to claim 1, wherein (A) is one or more alcohols (a4) selected from sorbitan fatty acid esters, polyalkyleneglycol fatty acid esters, glycerin fatty acid esters, sorbitan aliphatic ethers, polyalkyleneglycol aliphatic ethers, and glycerin aliphatic ethers.

8. The active energy ray-curable resin composition according to claim 1, wherein (B) is a monomer having one or more polymerizable functional groups selected from (meth)acrylate groups, (meth)acrylamide groups, vinyl groups, allyl groups, and maleimide groups.

9. The active energy ray-curable resin composition according to claim 1, wherein (B) is one or more monomers selected from (meth)acryloylmorpholine, N,N-dimethyl(meth)acrylamide, N,N-diethyl(meth)acrylamide, N,N-dimethylaminopropyl(meth)acrylamide, N-isopropyl(meth)acrylamide, N-hydroxyethyl(meth)acrylamide, N-methyl-N-hydroxyethyl(meth)acrylamide, N-hydroxypropyl(meth)acrylamide, N,N-bishydroxyethyl(meth)acrylamide, N-butoxymethyl(meth)acrylamide, and diacetone(meth)acrylamide.

10. A photocurable ink for a support material comprising the active energy ray-curable resin composition according to claim 1 and a photopolymerization initiator (C).

11. The photocurable ink for a support material according to claim 10 having an I/O value of 0.8 to 2.0.

12. The photocurable ink for a support material according to claim 10 that is used for inkjet type three-dimensional molding, comprising 1 to 80% by mass of (A), 20 to 99% by mass of (B), and 0 to 5% by mass of (C).

13. A three-dimensional molding photocurable ink for a model material, wherein inorganic groups/organic groups (I/O value) equals 0.4 to 0.8.

14. A three-dimensional molding ink set using a photocurable ink for a model material in which inorganic groups/organic groups (I/O value) equals 0.4 to 0.8 and a photocurable ink for a support material in which inorganic groups/organic groups (I/O value) equals 0.8 to 2.0.

15. A three-dimensional molded product that is molded by using the three-dimensional molding ink set according to claim 14.

16. A photocurable ink for a support material comprising the active energy ray-curable resin composition according to claim 1 and a photopolymerization initiator (C).

17. The photocurable ink for a support material according to claim 16 having an I/O value of 0.8 to 2.0.

18. The photocurable ink for a support material according to claim 16 that is used for inkjet type three-dimensional molding, comprising 1 to 80% by mass of (A), 20 to 99% by mass of (B), and 0 to 5% by mass of (C).

* * * * *